Jan. 5, 1926.

C. G. BRATTLAND
AIR MOTOR
Filed July 13, 1925

INVENTOR.
C. G. Brattland,
BY
Geo. P. Kimmel
ATTORNEY.

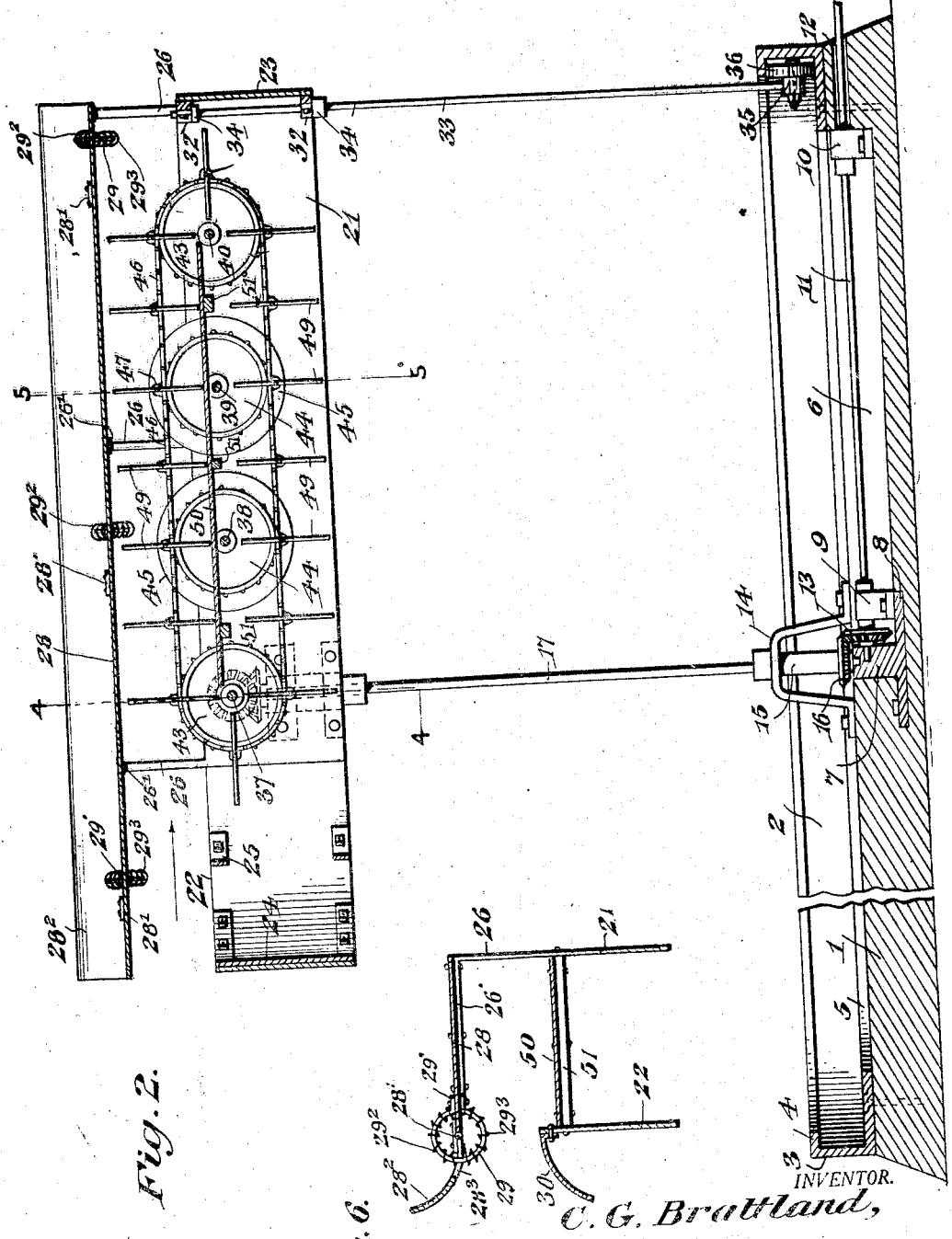

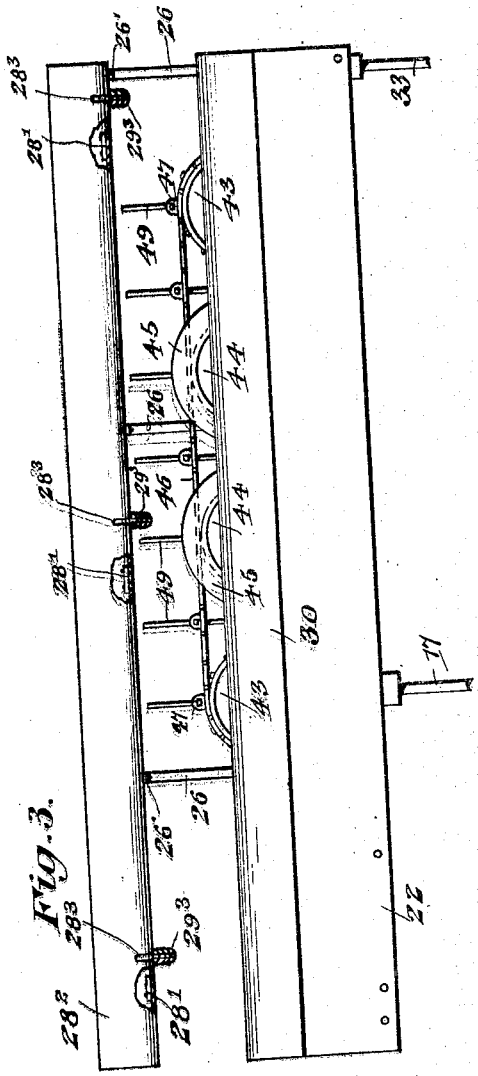
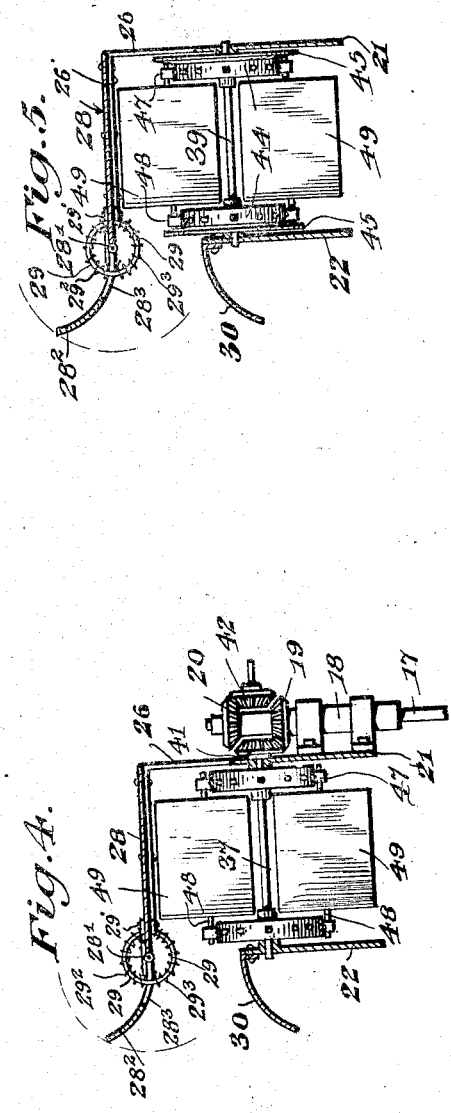

Jan. 5, 1926.

C. G. BRATTLAND

AIR MOTOR

Filed July 13, 1925

INVENTOR,
C. G. Brattland
BY
Geo. P. Kimmel
ATTORNEY.

Patented Jan. 5, 1926.

1,568,718

UNITED STATES PATENT OFFICE.

CLARA G. BRATTLAND, OF ADA, MINNESOTA.

AIR MOTOR.

Application filed July 13, 1925. Serial No. 43,312.

*To all whom it may concern:*

Be it known that I, CLARA G. BRATTLAND, a citizen of the United States, residing at Ada, in the county of Norman and State of Minnesota, have invented certain new and useful Improvements in Air Motors, of which the following is a specification.

This invention relates to power generating devices and pertains particularly to a motor adapted to be operated by wind power.

The primary object of the invention is the provision, in a manner as hereinafter set forth, of a wind operated motor designed to shift itself automatically in such a manner as to be constantly directed toward the wind to receive the maximum velocity thereof.

Another object of the invention is the provision, in a manner as hereinafter set forth, of a wind operated motor having diverging propeller containing compartments and deflecting walls between the compartments to guide the wind over propellers shiftably mounted therein.

A further object of the invention is the provision, in a manner as hereinafter set forth, of a wind operated motor of the character described, having means for directing a current of air into the rear of the motor to act upon the idling or returning propeller blades, to increase the efficiency of the device.

A still further object of the invention is the provision, in a manner as hereinafter set forth, of a wind motor having means for guiding the wind over a series of shiftable blades and further having means whereby the wind pressure in the compartment containing the blades, may be relieved in the event that the pressure becomes too strong.

A further and final object of the invention is the provision, in a manner as hereinafter set forth, of a wind motor of the character above described, which will be of simple but strong and durable construction, efficient in action and capable of producing the maximum amount of power from the wind passing thereover.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:—

Figure 2 is a central longitudinal sectional view of the same through one of the propeller compartments.

Figure 3 is a view in side elevation of one of the propeller compartments.

Figure 4 is a section taken upon the line 4—4 of Figure 2.

Figure 5 is a section taken upon the line 5—5 of Figure 2.

Figure 6 is a section through the propeller housing upon one side of the machine, the propeller mechanism being removed therefrom.

Figure 1:
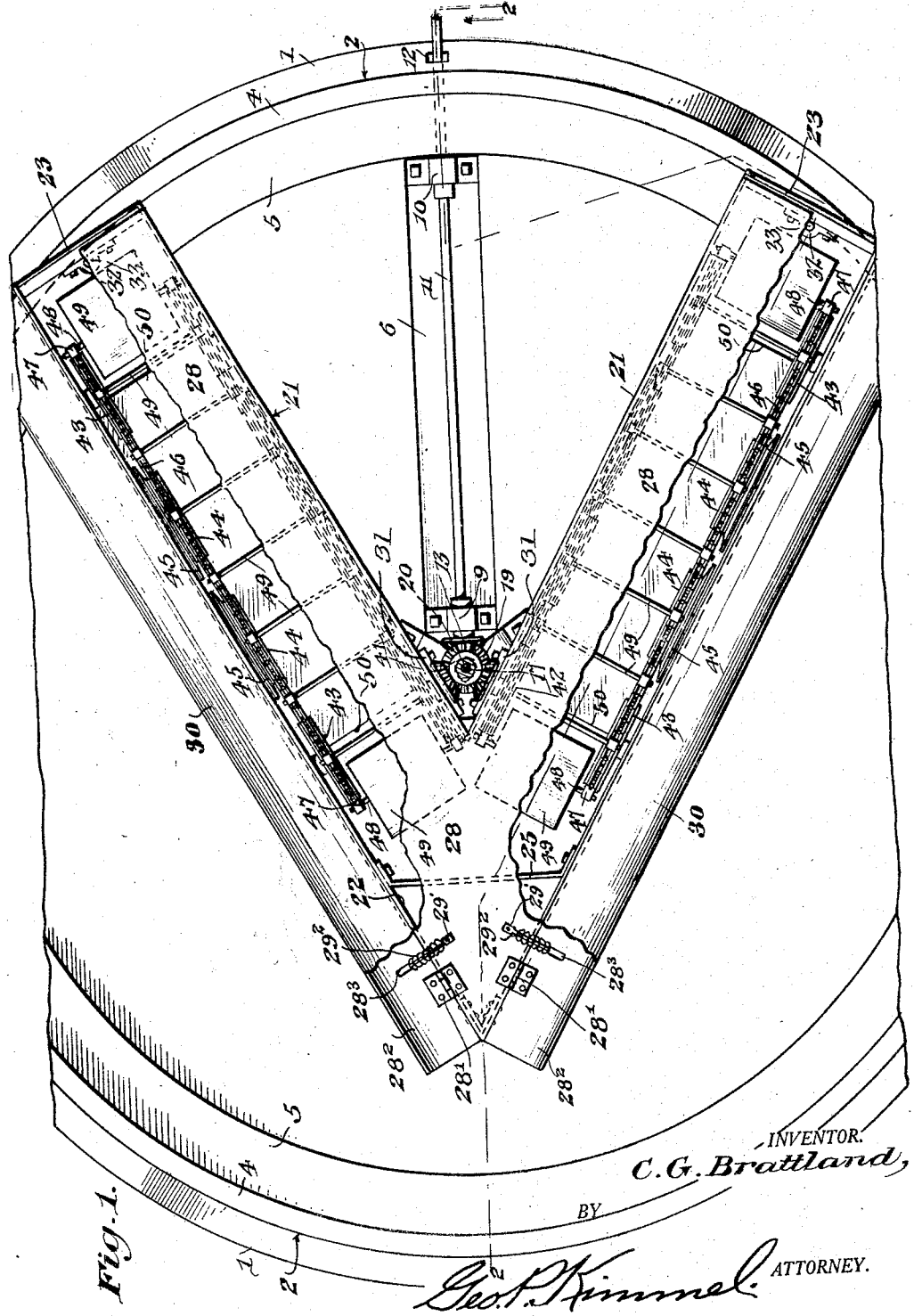
Figure 1 is a top plan view of the motor embodying this invention.

Referring now to the drawings in detail wherein like numerals of reference indicate corresponding parts throughout the several views, there is indicated at 1 a circular base upon which the motor is mounted and upon this base a circular track 2 is positioned. This circular track comprises a vertical outside portion 3 having inwardly extending top and bottom flanges 4 and 5 respectively, the bottom flange 5 being of greater width than the top flange 4 as is clearly shown in Figure 2.

The base 1 has a recessed portion 6 cut therein and extending from the center of the base to a point adjacent the periphery thereof as shown in Figure 2 and at the inner end of this recess there is set in the base a bearing block 7 having the flange 8 secured in the base as shown. Upon this flange is mounted a horizontal bearing 9 and at the opposite end of the recess 6 is a similar horizontal bearing 10. Mounted to revolve in these bearings is a shaft 11 the outer end of which extends through the base, through the passage 12, and at the outer end of this shaft any desirable means may be attached for taking the power therefrom. The inner end of the shaft between the bearing 9 and the bearing block 7 carries a bevelled gear 13 and the terminal inner end of the shaft 11 is mounted in the block 7 to revolve therein as shown.

Mounted at the central portion of the base 1 over the bearing block 7, is a spider support 14 bearing the vertical sleeve 15 upon the lower end of which there is fixed the bevelled gear 16 which meshes with the gear 13 carried upon the shaft 11. Extending through this sleeve 15 is a vertical shaft 17 the lower end of which is mounted to revolve in the block 7 as shown. This shaft is secured to the sleeve 15 to cause the same to revolve therewith. The upper end of the shaft 17 extends through a sleeve 18 to which it is fixed, and upon the upper end of this sleeve is mounted a bevelled gear 19 as shown in Figure 4. The shaft 17 extends beyond the upper end of the sleeve and bevelled gear 19 and carries upon its upper terminal end a second bevelled gear 20.

The motor body comprises a pair of V-shaped frames, an inner frame 21 and an outer frame 22. These frames are of the same size and shape and are set one within the other and in spaced relation as is shown in Figure 1, the arms of the frame 21 being of less length than those of the frame 22 and these arms of the two frames are connected by the rear cross members 23. The frame 22 as shown in Figure 1 is braced at the apex by the angle brace 24 and by the cross connecting brace 25.

The frames 21 and 22 in the spaced position in which they are shown in the plan view, form a pair of diverging casings or housings, the two housings forming together a V-shaped structure. The two frames 21 and 22 are substantially the same height and the frame 21 has extending upwardly therefrom the supports 26, the upper ends of which supports extend inwardly at right angles as indicated at 26' terminating at a point substantially above the top edge of the frame 22.

Upon these inwardly extending portions 26' a substantially V-shaped top or cover 28, is supported for the protection of the mechanism within the housing. The outer edges of the V-shaped cover 28 lie above the top edge of the outer frame 22 as is shown.

Secured along each outer edge of the top 28, by means of the hinges 28¹, which hinges are distributed in spaced relation against the free edges of the top, is a wind guiding or deflecting wing 28². These wings are of arcuate shape as clearly shown in Figures 4 and 5 and are provided at various points throughout their length with through slots 28³. Extending through the slots 28³, are split annular members 29 the ends of which are extended outwardly as at 29' and secured one upon the top and the other against the under side of the top 28. About the portion of the annulus 29 which extends above the top 28 is fitted a spiral spring 29² and upon that portion of the annulus 29 which is located beneath the top 28 is fitted a second spiral spring 29³. As is clearly shown the springs act in opposition one to the other against the wing 28² thus normally holding the wings in the extended position shown in Figures 4, 5 and 6. These springs act as controlling devices in preventing the wings 28² from being opened or closed extremely by the pressure of the wind and, when it is desired to close the housings the wings 28² can be secured down against the tension of the spring 29³.

Each arm of the outer frame 22 has extending outwardly and downwardly therefrom the curved shield or wind deflector 30, these deflectors being of the same length as the arms to which they are attached. The sleeve 18 to which the shaft 17 is secured, is secured between the arms of the frame 21 in the apex thereof, by means of the securing brackets 31. The inner portion of the structure is thus supported entirely upon the shaft 17. At the outer end of each of the housings, the end members 23 are provided with a pair of bearings 32 in which vertical depending revoluble shafts 33 are mounted and the bearings rest upon collars 34 secured about the shaft 33. The lower end of each of the shafts terminates in a bearing 35 through which a stub-shaft is passed to carry a roller member 36 which rides upon the lower flange 5 and beneath the upper flange 4 of the track member 2. Thus the outer end of each of the housings is supported and adapted to revolve about the supporting power shaft 17.

Extending transversely of each of the diverging housings between the walls formed by the spaced arms of the frames 21 and 22, are a series of revoluble shafts 37, 38, 39 and 40 respectively. The shaft 37 extends through the arms of the frame 21 and carry upon their inner terminal ends the bevelled gears 41 and 42. As shown in Figure 4 these shafts are out of alignment, the shaft carrying the gear 42 being a little higher than the shaft carrying the gear 41 so that the gear 41 will mesh with the gear 19 and the gear 42 will mesh with the gear 20.

Each of the shafts 37, 38, 39 and 40 in the two housings carry a pair of sprocket wheels thereon, the shafts 37 and 40 carrying plain sprocket wheels 43 while the shafts 38 and 39 carry a plain sprocket wheel 43 adjacent one end and a sprocket wheel 44 having an outwardly directed flange 45 thereon, at the other end.

In each of the housings between the frames 21 and 22 is a pair of endless chains 46 which pass over and connect the aligned sprocket wheels carried upon the shafts in the housing. Each of these chains has equi-distantly spaced thereon upstanding apertured lugs 47 and extending through the apertures in these lugs and connecting the sprocket chains are the ends of propeller carrying shafts 48, each of which shafts are secured across the central portion of and carries thereon a propeller 49. It will be noted upon reference to Figure 2 that the shafts and sprocket wheels in the housings are so mounted between the arms of the frames 21 and 22 that only those propellers 49 which are upon the upper portion of the endless chain will be exposed to the draft of wind entering the front part of the housing in the direction indicated by the arrow in Figure 2. The propellers upon the lowermost portion of the endless chains and which, when the machine is in operation, are moving toward the front to be carried up to receive the wind thereagainst after being exposed above the top edge of the frame 22, are protected from the wind and are not hindered in their return trip upon the chains.

The flanges 45 upon the pulleys 44 act to prevent the cross shafts 48 from working from one side to the other for, as the shaft moves over through the play that would be between the ends of the shafts and the lugs 47 in which they are mounted, one end of the shaft will abut the flange 45 and be prevented from further movement thereon.

Figure 9:
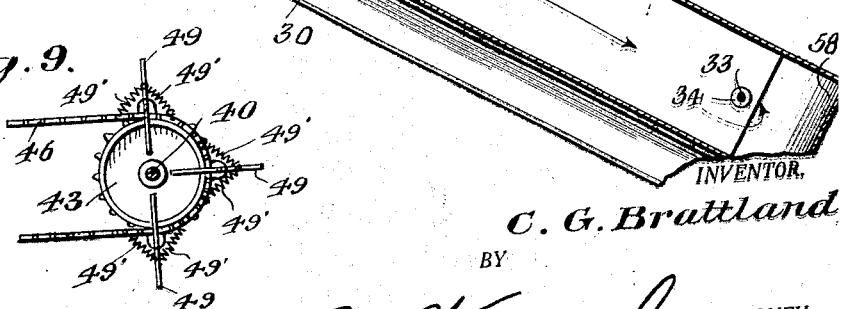
Figure 9 is an enlarged detail showing a certain modified structure.

In the detail illustrated in Figure 9 there is shown means whereby the propeller blades 49 may be securely maintained in position transversely of the sprocket chains 46 upon which they are mounted. This means comprises a pair of expansible springs 49' associated with each propeller, each spring having one end secured to one side of the propeller 49 adjacent the outer edge thereof as shown, while the other end of each of the springs is secured to the sprocket chains 46. Assurance is thus had that the wings or propellers 49 will be always maintained in a position to receive the maximum force of the air current.

Extending transversely of each of the casings between the arms of the frames 21 and 22, is a division member or partition 50, which partition is positioned horizontally between the propellers 49 as shown in Figure 2, and are held in this horizontal position by means of the cross supporting members 51. This partition 50 prevents the wind from being deflected downwardly from the rearwardly moving propellers 49 and interfering with the forward movement of the idling propellers.

Figure 7:
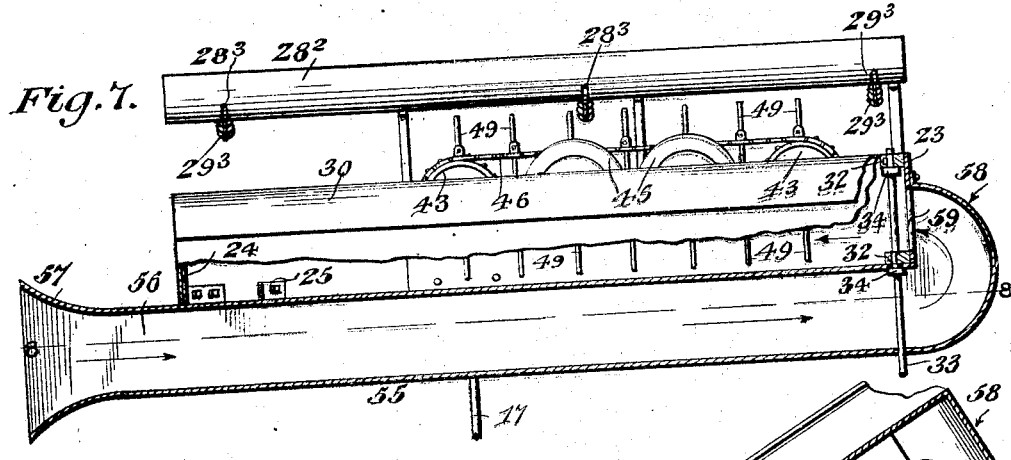
Figure 7 is a longitudinal sectional view through the lower portion of one propeller housing showing a modified construction of the same.
Figure 8:
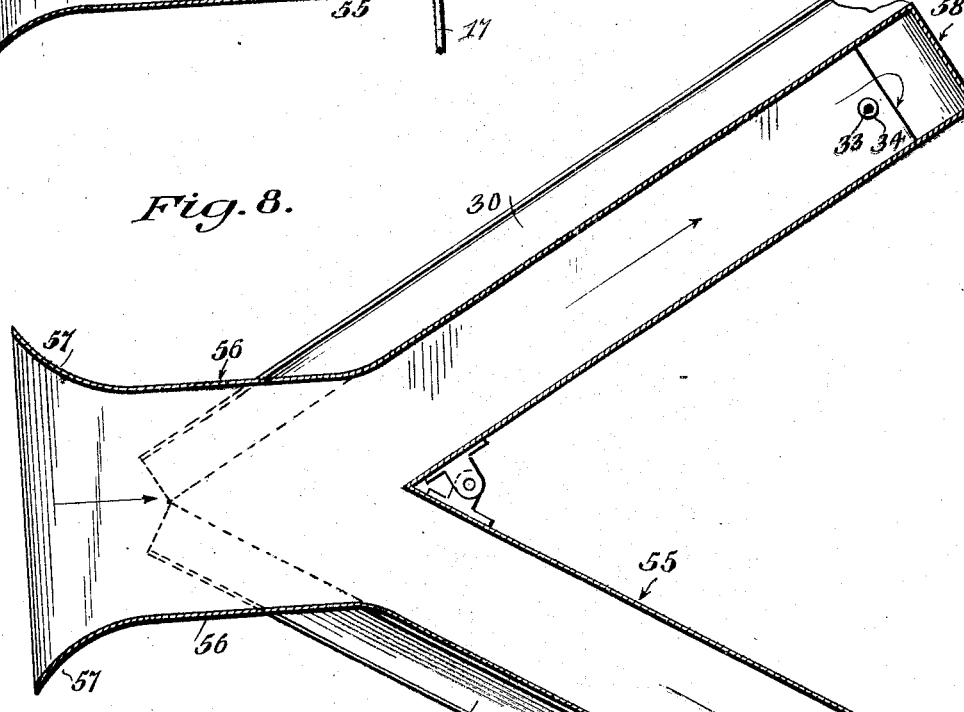
Figure 8 is a section taken upon the line 8—8 of Figure 7.

In Figures 7 and 8 there is shown a modification of the structure disclosed in Figures 1, 2 and 3 and herein a means is provided whereby air currents will be directed against the back of the idling or returning propellers 49.

The structure of this modification is the same throughout as the structure shown in Figures 1, 2 and 3 with the following additions:—

Extending throughout the length of each of the mechanism housings in which the propeller structures are mounted, is an air chute or passage indicated generally by the numeral 55. These air chutes or passage ways are relatively broad and merge at their forward ends into the funnel shaped entrance 56 the outer ends of which entrance are flared as indicated at 57 to receive the maximum amount of air. When the wind enters the funnel it is split and travels in two directions following the passage ways shown and at the rear of each passageway a return bend 58 is provided which directs the air current through the aperture 59 formed in the rear cross members 23. The terminal portion of this return bend is secured to this cross member as shown.

It will thus be seen that those currents of air which do not pass through the upper portion of the mechanism housings to act against the rearwardly moving propellers 49, will enter the funnel 56 and be directed through the passages 55 and will exert their force against the returning propellers 49 thus materially increasing the power of the device.

From the foregoing description it will be readily seen that this machine will point itself toward the wind at all times and the wind will thus be directed against the two series or sets of propeller blades mounted in the diverging casing so that both series of blades will be in continuous operation transmitting power through the bevelled gears 19, 20, 41 and 42 through the shaft 17 and then through the lead off shaft 11. As has been before stated in the event that the wind velocity becomes too great against the rearwardly moving propeller blade 49 the strain will be relieved somewhat by the lifting of the cover 28 against the tension of the springs 29.

Having thus described my invention what I claim is:—

1. An air motor of the character set forth comprising, a vertical power shaft, a pair of elongated casings mounted in divergent relation upon the upper end of said shaft to swing thereabout, said casings having open tops, wind operable power elements movable longitudinally of each casing, and means for imparting power developed by said elements to said shaft.

2. An air motor of the character set forth comprising, a circular base track, a vertical power shaft in the center of said track, a pair of connected diverging relatively long housings open at the top and mounted upon said shaft to swing thereabout, means for supporting the outer ends of said housings, and adapted to move over said track, an endless series of propeller elements mounted in each housing, certain of said elements being always exposed above said open top, and means for connecting said propeller elements with said shaft for transmitting power thereto.

3. An air motor of the character set forth comprising, a circular base track, a vertical power shaft in the center of said track, a pair of connected diverging relatively long housings open at the top and mounted upon said shaft to swing thereabout, means for supporting the outer ends of said housings and adapted to move over said track, transversely mounted revoluble shafts in each housing, sprocket wheels on each shaft, endless chains connecting said wheels, propeller elements carried upon said chains, certain thereof being exposed above said open tops to the air currents, and means for connecting certain of said transverse shafts with said vertical shaft for transmitting power thereto.

4. An air motor of the character set forth comprising, a circular base track, a vertical power shaft in the center of said track, a pair of connected diverging relatively long housings open at the tops and mounted upon said shaft to swing thereabout, means for supporting the outer ends of said housings and adapted to move over said track, transversely mounted revoluble shafts in each housing, sprocket wheels on each shaft, endless chains connecting said wheels, propeller elements carried upon said chains, certain thereof being exposed above said open tops to the air currents, means for connecting certain of said transverse shafts with said vertical shaft for transmitting power thereto, and spring controlled wings upon one side of each housing for controlling the air pressure passing over the propellers.

5. An air motor of the character set forth comprising, a circular base track, a vertical power shaft in the center of said track, a pair of connected diverging relatively long housings formed of a pair of spaced substantially V-shaped frames connected at their rear ends, and open top and bottom, means for supporting the rear ends of said housings having engagement with and moving over said track, a series of transverse revoluble shafts in each housing and extending longitudinally thereof, sprocket wheels on said shafts, endless chains connecting said wheels, a series of spaced transversely extending propeller blades carried between the chains in each housing, certain of the blades being exposed above the top of the housing to be acted upon by the air currents, and means for connecting certain of said transverse shafts with said vertical shaft for conveying power thereto.

6. An air motor of the character set forth comprising, a circular base track, a vertical power shaft in the center of said track, a pair of connected diverging relatively long housings formed of a pair of spaced substantially V-shaped frames connected at their rear ends, an open top and bottom, a top overlying and spaced from the top of each housing, means supporting the rear ends of said housings having slidable engagement with said track, a series of transversely revoluble shafts in each housing and extending longitudinally thereof, sprocket wheels on said shafts, endless chains connecting said wheels, a series of spaced transversely extending propeller blades carried between the chains in each housing, certain of the blades being exposed above the top of the housing to be acted upon by air currents, means for connecting certain of said transverse shafts with said vertical shaft for conveying power thereto, and a horizontal spring controlled element hingedly secured along the outer edge of each top to control the pressure of the air current passing over the propellers.

7. An air motor of the character set forth comprising, a circular base track, a vertical power shaft in the center of said track, a pair of connected diverging relatively long housings open at the tops and mounted upon said shaft to swing thereabout, means for supporting the outer ends of said housings and adapted to move over said track, transversely mounted revoluble shafts in each housing, sprocket wheels on each shaft, endless chains connecting said wheels, propeller elements carried upon said chains, certain thereof being exposed above said open tops to the air currents, means for connecting certain of said transverse shafts with said vertical shaft for transmitting power thereto, spring controlled wings upon one side of each housing for controlling the air pressure passing over the propellers, and means for conveying air currents to the rear of each housing and directing the same against the rear of returning idling propellers.

8. An air motor of the character set forth comprising, a circular base track, a vertical power shaft in the center of said track, a pair of connected diverging relatively long housings open at the tops and mounted upon said shaft to swing thereabout, means for supporting the outer ends of said housings and adapted to move over said track, transversely mounted revoluble shafts in each housing, sprocket wheels on each shaft, endless chains connecting said wheels, propeller elements carried upon said chains, certain thereof being exposed above said open tops to the air currents, means for connecting certain of said transverse shafts with said vertical shaft for transmitting power thereto, spring controlled wings upon one side of each housing for controlling the air pressure passing over the propellers, means for conveying air currents to the rear of each housing and directing the same against the rear of returning idling propellers, means to provide a pair of diverging air ways, one extending beneath each housing, a return bend connecting each end of said air way with the rear of a housing to direct air thereinto against returning propeller elements, and an air receiver at the forward part of said housing common to both airways.

In testimony whereof, I affix my signature hereto.

CLARA G. BRATTLAND.